United States Patent [19]

Utsunomiya et al.

[11] Patent Number: 5,430,706
[45] Date of Patent: Jul. 4, 1995

[54] MAGNETO-OPTICAL DISK HAVING LANDS AND GROOVES FOR RECORDING INFORMATION

[75] Inventors: Hajime Utsunomiya; Masanori Shibahara, both of Nagano, Japan

[73] Assignee: TDK Corporation, Tokyo, Japan

[21] Appl. No.: 226,961

[22] Filed: Apr. 12, 1994

[30] Foreign Application Priority Data

Apr. 16, 1993 [JP] Japan ................. 5-113645

[51] Int. Cl.⁶ ............................................. G11B 7/24
[52] U.S. Cl. .................... 369/275.1; 369/277; 369/275.4
[58] Field of Search ........... 369/275.1, 275.2, 275.3, 369/275.4, 13, 277, 278, 279, 283, 284

[56] References Cited

U.S. PATENT DOCUMENTS

| | | | |
|---|---|---|---|
| 4,931,336 | 6/1990 | Hameda | 428/64 |
| 5,144,552 | 9/1992 | Abe | 369/277 |
| 5,187,703 | 2/1993 | Katayama et al. | 369/275.1 |
| 5,274,623 | 12/1993 | Usami et al. | 369/275.4 |
| 5,325,353 | 6/1994 | Sasaki et al. | 369/275.5 |

FOREIGN PATENT DOCUMENTS

| | | | |
|---|---|---|---|
| 63-7536 | 1/1988 | Japan | 369/275.4 |
| 1286134 | 11/1989 | Japan | 369/275.4 |
| 5-198016A | 1/1992 | Japan | |
| 4358331 | 12/1992 | Japan | 369/275.4 |
| 5-67355 | 3/1993 | Japan | 369/275.4 |

*Primary Examiner*—Joseph A. Popek
*Assistant Examiner*—Vu Le
*Attorney, Agent, or Firm*—Watson, Cole, Grindle & Watson

[57] ABSTRACT

A magneto-optical disk is made up of a disk form of substrate including on its surface a recessed area having at least one of a groove and pits, and a recording layer provided such that it covers the recessed area. The geometry of at least one of the groove and pits is designed to conform to $\theta_{10} \geq \theta_{50}$ and $\theta_{50} > \theta_{90}$ where $\theta_{10}$, $\theta_{50}$ and $\theta_{90}$ are respectively the angles that tangential lines make with horizontal lines at 10%, 50% and 90% depth positions of a side wall of the recess in the diametrical direction of the substrate. This magneto-optical disk is improved in terms of the push-pull signal level, radial contrast, skew margin and C/N.

28 Claims, 3 Drawing Sheets

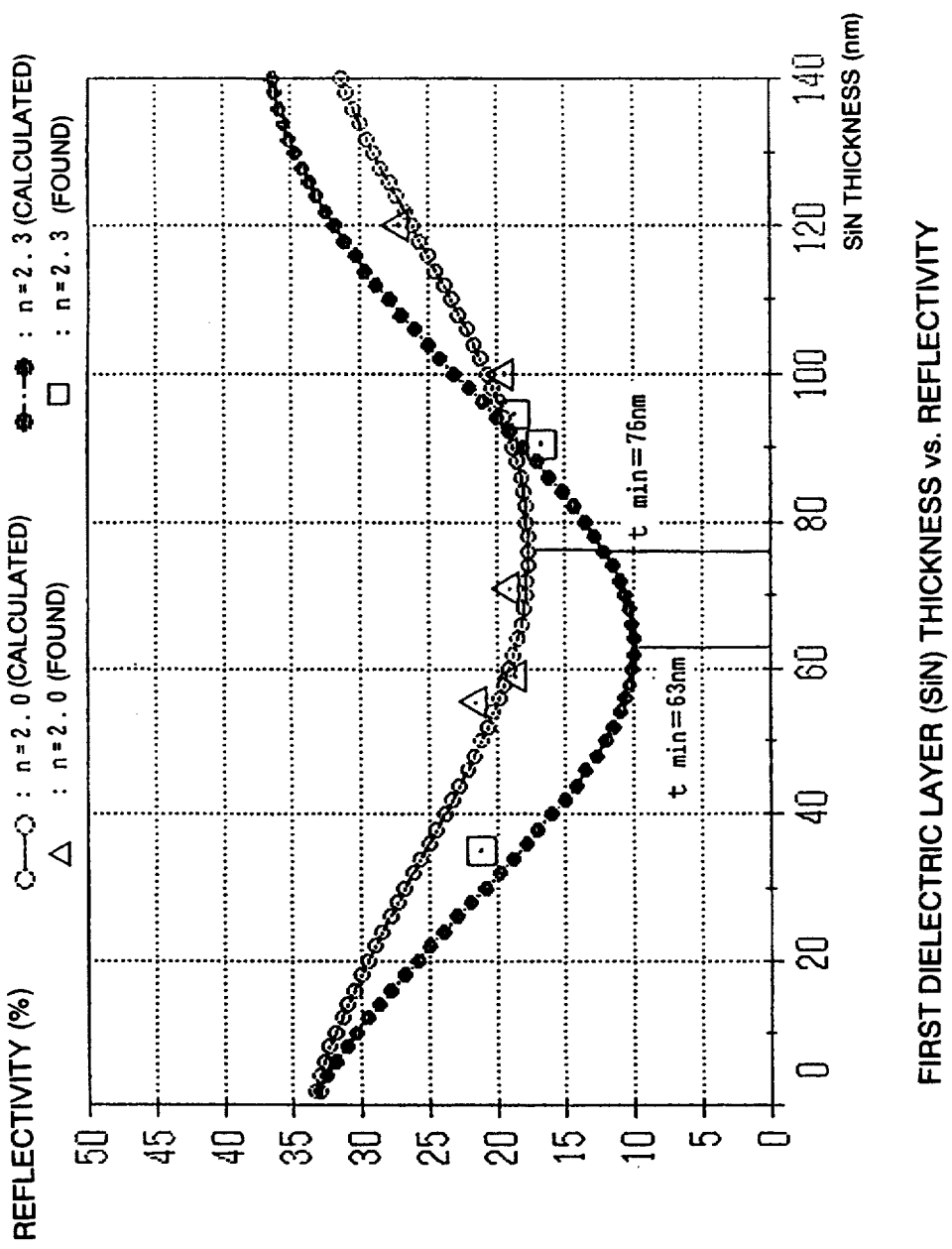

MAGNETO-OPTICAL DISK HAVING LANDS AND GROOVES FOR RECORDING INFORMATION

BACKGROUND OF THE INVENTION

The present invention relates generally to a magneto-optical disk, and more particularly to a magneto-optical disk having at least a groove on the surface of a substrate and a magneto-optical recording method for the magneto-optical disk.

A magneto-optical disk is built up of a substrate having a groove and pits, on which a magneto-optical recording layer is formed. At the time of recording and reproduction the intensity of light reflected from the vicinity of the groove is detected to do tracking control, track counting during seeking, etc.

Among properties taking part in these controls there are a push-pull signal level, a radial contrast, and a skew margin.

The push-pull signal is understood to refer to a tracking signal generated when tracking is controlled by the push-pull method. Here it is noted that the pull-push method is one in which light reflected and diffracted by the groove or pits is received by two light receiving portions of a split-half photodiode that are disposed symmetrically with respect to the center of the track to detect a tracking error on the basis of a difference in the resulting outputs. If $I_1$ and $I_2$ represent the outputs of the light-receiving portions, respectively, the push-pull signal level P-P will be given by $$(I_1-I_2)/(I_1+I_2)$$

At too low a push-pull signal level normal tracking is unlikely to occur. When the push-pull signal level is too high, on the other hand, it is incompatible with other optical properties and, although depending on the type of optical head, noises are likely to occur in the focus-servo signal. Generally, it is desired that the push-pull signal level be within the ranges of 0.11 to 0.20 and 0.04 to 0.11 in the groove and pits, respectively.

For instance, now let $I_L$ and $I_G$ designate the outputs of the land and groove portions of a signal in a grooved area, which is generated when a low-pass filter is used. Then the radial contrast RC is given by $$RC=2|I_L-I_G|/(I_L+I_G)$$

From the RC output it is possible to know the number of tracks which are jumped over by the optical head and the direction of movement (polarity) of the optical head. When the radial contrast is too indefinite, an error is likely to occur in counting tracks or judging polarity, whereas when the radial contrast is too sharp, disturbance noises are likely to make the servo system unstable. It is generally desired that the radial contrast RC be within the range of 0.20 to 0.35 in the groove and within the range of 0.15 to 0.30 in the pit, respectively.

The term "skew margin" used in the present disclosure is understood to mean to what degree information is read when a magneto-optical disk inclines. For instance, consider the case where the disk inclines to an associated optical pickup in the radial direction. As the angle of inclination increases, more increased are errors in reading signals. Eventually the errors exceed the demanded (standard) value. In other words, the skew margin is understood to refer to the angle range in which signals are read within the standard value in a stable manner. The larger this angle, the better.

The push-pull signal level, radial contrast and skew margin vary depending on groove width and depth, and on the basic angle or bottom angle of the groove-forming side walls as well. Here, too, C/N varies. In other words, the radial contrast increases with an increase in groove depth (provided that groove depth $\leq \lambda/4n$). This is also true even when the basic angle $\theta$ is increased so as to make the groove wide. The push-pull signal level decreases with a decrease in groove depth (provided that groove depth $\leq \lambda/8n$) and, again, with an increase in groove width (provided that groove pitch = 1.6 μm and groove width $\geq 0.8$ μm). C/N increases with an increase in groove width or with an increase in the basic angle $\theta$. The skew margin decreases with an increase in the basic angle $\theta$. Therefore, much difficulty is involved in allowing all the push-pull signal level, radial contrast and skew margin to have satisfactory values and obtain good-enough C/N as well. Here it is desired that C/N be 47 dB or more.

It is therefore a primary object of the present invention to provide a magneto-optical disk having satisfactory values for its push-pull signal level, radial contrast and skew margin, and having good-enough C/N as well.

SUMMARY OF THE INVENTION

According to one aspect of the present invention, there is provided a magneto-optical disk made up of a disk form of substrate including on its surface a recessed region having at least one of a groove and pits, and a recording layer provided such that it covers the recessed area, wherein: the geometry of at least one of said groove and pits conforms to $$\theta_{10} \geq \theta_{50}$$

$$\theta_{50} > \theta_{90}$$

where $\theta_{10}$, $\theta_{50}$ and $\theta_{90}$ are respectively the angles that tangential lines make with horizontal lines at 10%, 50% and 90% depth positions of a side wall of the recess in the diametrical direction of the substrate.

Preferably, the geometry of at least one of the groove and pits conforms to $$\theta_{10} > \theta_{50}$$

$$\theta_{50} > \theta_{90}$$

Preferably, the angle $\theta_{50}$ is 20 degrees or more.
Preferably, the angle $\theta_{50}$ is 25 degrees or more.
Preferably, the track pitch is 1.60 μm or less.
Preferably, the magneto-optical disk is made up of a substrate including thereon a first dielectric layer, a recording layer, a second dielectric layer, a metallic reflecting layer and a protecting coat in this order, wherein:
the thickness of the first dielectric layer is made smaller than a first minimal point $t_{min}$ of reflectivity at the smallest thickness of a thickness-reflectivity curve at the wavelength of recording light, and
magneto-optical recording is done in a magnetic field modulation mode.

Preferably, the thickness of the first dielectric layer is from 30 nm to 0.99 $t_{min}$ inclusive.

Preferably, the refractive index n of the first dielectric layer is from 1.8 to 3.0.

As a result of experimentation carried out with grooves having various configurations in section, it has now been found that the push-pull signal level, radial contrast, skew margin and C/N are dependent on the sectional geometry of a groove in addition to groove width and depth. By making the above-mentioned three angles $\theta_{10}$, $\theta_{50}$ and $\theta_{90}$ of the sectional geometry of the groove satisfy the relations:

$$\theta_{10} \geqq \theta_{50}$$

$$\theta_{50} > \theta_{90}$$

it is possible to achieve the above-mentioned properties easily.

Of importance in the present invention are the three angles at the 10% and 90% depth positions of the side wall forming a groove, etc., rather than the lowermost and uppermost angles thereof, as mentioned above. This is because the lowermost and uppermost portions are likely to sag during groove formation.

A conventional information-recording medium characterized by groove geometry is known from JP-A-2-78038. The groove set forth in this publication is characterized in that both the top and corner (bottom) portions of its side wall are rounded into a circular arc. In the invention, however, all but the portions that are likely to sag during groove formation are designed to meet the relation $\theta_{10} \geqq \theta_{50}$, thereby making the angle of the above-mentioned corner (bottom) portion acute. In the case of the groove set forth in the above-mentioned publication, it is expected that C/N may drop to some degree, but this does not hold for the present invention.

In the present invention, while the angle $\theta_{50}$ is kept at preferably 20 degrees or more and more preferably at 30 degrees or more with groove depth maintained at a given value, the track pitch is made narrow-enough to increase recording density. As can be understood from the examples described in the above-mentioned publication, however, these conventional grooves had all an angle $\theta_{50}$ of 14 degrees; that is, when the track pitch is made narrow, as mentioned above, there is no other choice but to make groove depth small.

BRIEF DESCRIPTION OF THE DRAWINGS

By way of example but not by way of limitation, the invention will now be explained with reference to the accompanying drawings, in which:

FIG. 3 is a graph showing the relation between the thickness and reflectivity of the first dielectric layer.

DETAILED EXPLANATION OF THE INVENTION

The present invention will now be explained in greater detail.

In the magneto-optical disk according to the present invention, a disk form of substrate includes a grooved region on its surface, and is provided with a recording layer large-enough to cover the grooved region. When preformatted, the magneto-optical disk of the invention includes a pitted region. This pitted region is provided in such areas as read-in or read-out ones, in which information for enabling hardware to use the disk under proper conditions or discrete information such as pulse signals of a given period is previously recorded. The groove or pit array may be provided in spiral or concentric configuration.

The grooved region is made up of a combined groove and land. The groove is provided so as to track recording or reproduction light, and may be wobbled to control the revolutions per minute of the disk or carry thereon additional information such as time or address information. In the magneto-optical disk of the invention information is recorded in the groove.

Figure 1:
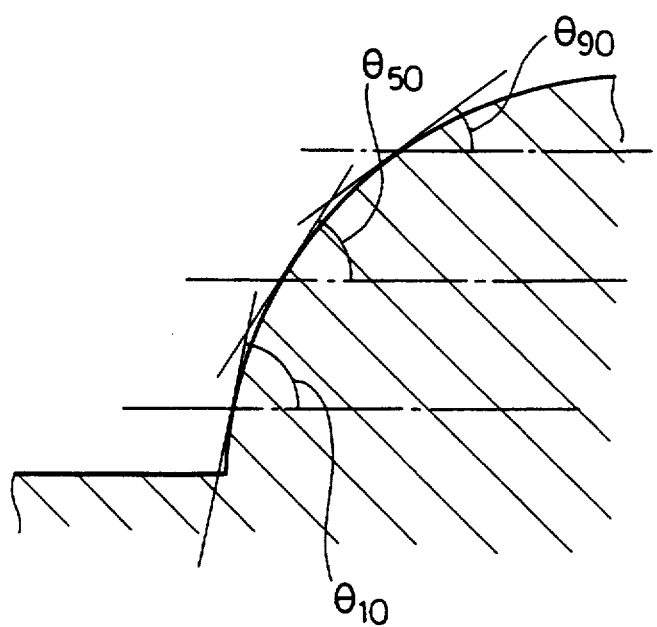
FIG. 1 is a sectional schematic of the geometry of the groove on one embodiment of the magneto-optical disk according to the invention.

In the magneto-optical disk of the present invention, the geometry of the groove mentioned above is designed to conform to $$\theta_{10} \geqq \theta_{50}$$

$$\theta_{50} > \theta_{90}$$

where $\theta_{10}$, $\theta_{50}$ and $\theta_{90}$ are respectively the angles that tangential lines make with horizontal lines at 10%, 50% and 90% depth positions of a side wall of the groove in the diametrical direction of the substrate, as shown in FIG. 1. Groove depth is here understood to mean a distance between the surface of the land and the base of the groove, as measured in the direction vertical to the major surface of the substrate. In particular, it is desired that $\theta_{10} > \theta_{50}$.

When the angles $\theta_{10}$, $\theta_{50}$ and $\theta_{90}$ fail to conform to the relations mentioned above, much difficulty is involved in satisfying all the push-pull signal level, radial contrast and C/N at the same time. That is, if $\theta_{10} < \theta_{50}$, there will then be substantial decrease in groove width, resulting in a decrease in the amount of information recorded and a lowering of the radial contrast. If $\theta_{50} \leqq \theta_{90}$, on the other hand, the radial contrast RC will then become too sharp, resulting in a decrease in the skew margin.

Such a skew margin reduction offers a grave problem. For instance, when the clamped disk is inclined as by dust or slight misalignment, such a small skew margin causes errors to increase drastically. More specifically, when recording or reproduction is carried out at skew margin angles of $\pm 0.6$ degrees (corresponding to Sample 5 that will be referred to in the examples), $\pm 1.0$ degree (Sample 1) and $\pm 1.2$ degrees (Sample 3) while the disk is kept horizontal, the block error rates are all of the order of $4 \times 10^{-3}$. When recording or reproduction is done while the disk is inclined at an angle of 1 degree, however, the block error rates are increased to $7 \times 10^{-2}$, $1.5 \times 10^{-2}$ and $9 \times 10^{-3}$, respectively. In other words, even a slight increase in the skew margin angle offers a greater advantage.

The angle $\theta_{50}$—the larger, the better—lies preferably in the range of usually 20 to 80 degrees and particularly 25 to 80 degrees. The angle $\theta_{10}$—the larger, the better—is preferably 20 degrees or more. It is here understood that the upper limit of $\theta_{10}$ is about 80 degrees as is the case with the angle $\theta_{50}$. The angle $\theta_{90}$—the smaller, the better—lies usually in the range of 10 to 80 degrees. It is desired that a difference between $\theta_{10}$ and $\theta_{50}$ or $\theta_{10} - \theta_{50}$ be 0 to 60 degrees, preferably 1 to 30 degrees, and a difference between $\theta_{50}$ and $\theta_{90}$ or $\theta_{50} - \theta_{90}$ be 5 degrees or more, particularly 10 degrees or more.

No critical limitation is imposed on how to make the side wall geometry of the groove conform to the conditions mentioned above. For instance, the angles $\theta_{10}$, $\theta_{50}$ and $\theta_{90}$ may be allowed to have desired values, if a resist of suitable resolution is selectively used at the mastering step of making a stamper used for substrate preparation and conditions for irradiation with light are varied depending on the purpose.

No particular limitation is placed on groove width and land width, but the effect of the invention is enhanced when land width is narrow, and particularly augmented when the ratio of groove width to land width is 1 or more. While actual groove width may be determined depending on various conditions such as the spot diameter of a light beam and track pitch, it is understood that the invention is extremely effective for the case where the optical system to be described later is used with a track pitch of about 1.2 to 1.6 μm, particularly about 1.50 to 1.59 μm and a groove width of about 0.90 to 1.15 μm.

Groove depth is not particularly critical, and may be determined depending on groove width, while consideration is taken into various properties such as tracking and seek. For instance, when the optical system to be described later is used with a groove width of 0.90 to 1.15 μm, groove depth lies preferably in the range of 600 to 900 Å. Here, by definition, the groove depth is a distance between the surface of the land and the base of the groove as measured in the direction vertical to the major surface of the substrate. When the base of the groove and the surface of the land are not flat, the groove depth is defined as being a distance between the lowermost position of the bottom of the groove and the uppermost position of the surface of the land, as measured in the vertical direction.

When pits are formed, the side walls of the pits must also conform to the conditions for the side walls of the grooves. Since the pits and grooves are irradiated with the same light beam, it is desired that pit size be determined depending on groove size so as to achieve sufficient properties in the region in which the pits are formed. For instance, when the groove size lies in the above range, it is preferable that pit width and depth, as measured in the diametrical direction of the substrate, are 0.40–0.50 μm and 650–900 Å, respectively.

The sectional geometry and size of the groove or pits may be measured as by a scanning tunnel microscope (STM) or a scanning electron microscope (SEM). It is understood that groove width is by definition a distance between the depthwise midpoint of one side wall and the depthwise midpoint of the other side wall, as measured in the transverse section of the groove. It is also understood that groove depth is determined by the method mentioned above. It is further noted that land width is a value obtained by subtracting groove width from track pitch and pit size is found, as in the case of the groove.

In this regard, it is noted that groove or pit size is a mean value of measurements of five or more grooves or pits.

Figure 2:
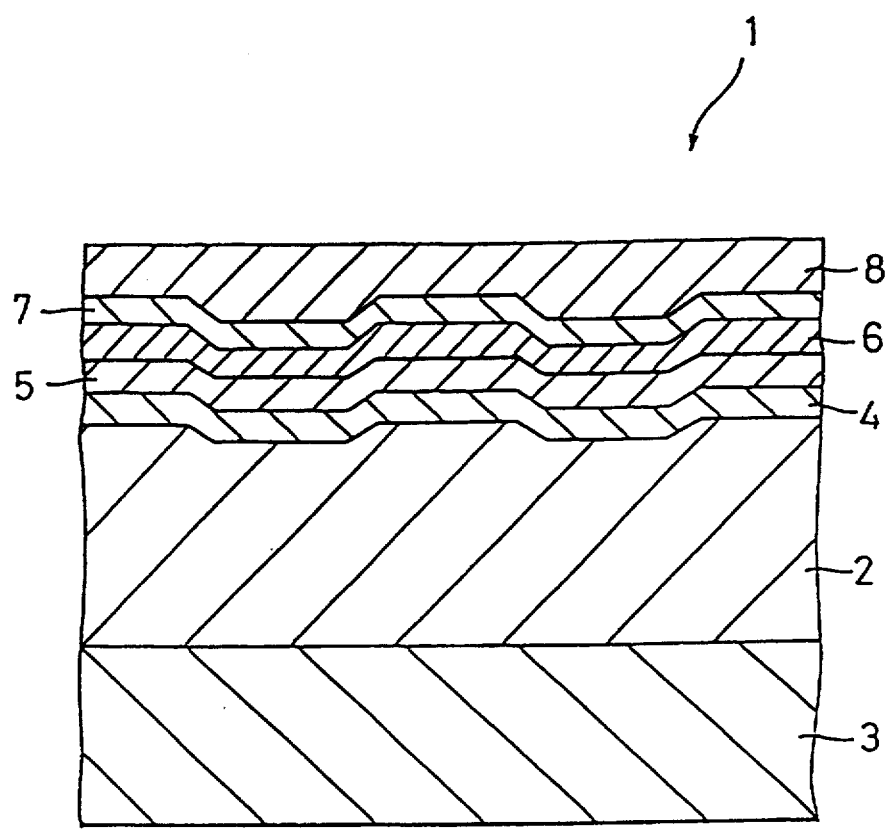
FIG. 2 is a partial section of one embodiment, of the magneto-optical disk according to the invention.

It is desired that the magneto-optical disk according to the invention be of such structure as illustrated in FIG. 2 by way of example. More illustratively, a magneto-optical disk 1 according to the invention is built up of a substrate 2 on which a first dielectric layer 4, a recording layer 5, a second dielectric layer 6 and a reflecting layer 7 are provided together in this order.

The first dielectric layer 4 is provided between the substrate 2 and the recording layer 5 so as to achieve an improvement in corrosion resistance in addition to the enhancing effect of the recording layer 5, and is made smaller in thickness than the first minimal point $t_{min}$ of reflectivity, thereby reducing its own heat capacity and so allowing the underlying resin substrate to have an effective action on heat storage. As already stated, this gives rise to an increase in sensitivity, a lowering of $P_{min}$ (in the following description $P_{min}$ and $P_{max}$ stand for recording powers at which a jitter falls below 40 nsec), and a decrease in the optimal power 1.4 $P_{min}$. Also, the recording power margin $(P_{max}-P_{min})/2$ is increased.

Here reference is made to the above first minimal point of reflectivity. On a reflectivity-thickness curve maximal and minimal points appears periodically due to the interference effect in the film. By way of example, the relation between the thickness and reflectivity of SiNx at a recording wavelength of 780 nm is shown in FIG. 3. The curve shown in FIG. 3 is a simulation curve obtained when the index of refraction n is varied by varying the value of x of SiNx, with found values plotted. As can be seen from FIG. 3, the simulation curve is in good agreement with the found values; a minimal point or the first minimal point $t_{min}$ at the smallest thickness exists in the vicinity of 76 nm at n=2.0 and 63 nm at n=2.3, respectively. Thus, according to the present invention, it is intended to achieve given reflectivity at a thickness smaller than $t_{min}$. The reason no thickness smaller than $t_{min}$ has been used so far in the art appears to the idea that in view-of corrosion resistance and reliability better results would be obtained by increasing reflectivity at a larger thickness.

In the case of a dielectric layer of silicon nitride, etc., however, it has now been found that sufficient corrosion resistance and reliability are achievable at a thickness of about 30 nm. In other words, the thickness of the first dielectric layer 4 is preferably at least 30 nm, particularly at least 40 nm and more particularly at least 45 nm, but must be up to 0.99 $t_{min}$, particularly up to 0.98 $t_{min}$ and more particularly up to 0.96 $t_{min}$. It is here noted that $t_{min}$ is generally about 40 to 90 nm.

Preferably, the refractive index n (a real part of the index of double refraction) of the first dielectric layer 4 is 1.8 to 3.0, particularly 1.8 to 2.5. If n is too small, there will then be a decrease in the Kerr angle of rotation with an output decrease, and if n is too large, there will then be an output decrease with increased noise.

The first dielectric layer 4 may be composed of various dielectric materials such as oxides, carbides, nitrides, and sulfides, for instance, $SiO_2$, SiO, AlN, $Al_2O_3$, $Si_3N_4$, ZnS, BN, $TiO_2$ and TiN, or their mixtures. Among these, the dielectric materials composed mainly (or of 90% or more silicon nitride) or substantially of silicon nitride are particularly preferable, and may be formed into films by various vapor film-forming techniques. Usually, it is preferable to use sputtering, for which a sintered member having the corresponding composition may be used as a target, or reactive sputtering using nitrogen, etc. The second dielectric layer 6 is provided on the recording layer 5 for the purpose of increasing the enhancement effect and corrosion resistance of the recording layer 5. Therefore, this may be made of all the same materials of which the first dielectric layer 4 is made. In the present invention, however, it is desired to use a material containing preferably at least 90% of silicon nitride, or a material containing an oxide of at least one rare earth element (including Y), silicon oxide and silicon nitride for the purpose of achieving an improvement in sensitivity and enhancing the recording power margin due to the heat storage effect of the metal reflecting layer 7 when provided. In particular, a material containing the oxide of a rare earth element(s), silicon oxide and silicon nitride is best-suited for the invention.

In such cases, the rare earth element or elements may be selected from Y, La—Sm, and Eu—Ln. Among others, it is desired that the dielectric layer 6 contain lanthanoid elements including Y, particularly at least one of La and Ce. Usually the oxides of La and Ce are $La_2O_3$ and $CeO_2$. These oxides may generally have a stoichiometric composition, or may not. When the dielectric layer 6 contains La and/or Ce, their oxides may be used either alone or in combination with each other at any desired quantitative ratio. In addition to the oxides of La and/Ce, the dielectric layer 6 may contain oxides of rare earth elements such as Y and Er in an amount of up to about 10 at % (calculated as metal) relative to the rare earth oxides. Moreover, the dielectric layer 6 may contain oxides of Fe, Mg, Ca, Sr, Ba and Al. In this regard, Fe may be used in an amount of up to 10 at % with other elements used in a total amount of up to 10 at %.

In one optimal example the second dielectric layer 6 contains silicon oxide and silicon nitride in addition to the rare earth oxides. In this layer 6 silicon oxide and silicon nitride are contained in the form of $SiO_2$ or $SiO$ and $Si_3N_4$, respectively, which may or may not have a stoichiometric composition. In such second dielectric layer 6 the quantitative (molar) ratio of the oxides of rare earth elements to the Si compounds, or the total of the oxides of rare earth elements to the total of the Si compounds and the oxides of rare earth elements, may lie in the range of about 0.05 to 0.5, as calculated stoichiometrically; that is, it is preferable that the dielectric layer 6 contain 5 to 50 mol % of the oxides of rare earth elements, as calculated stoichiometrically. At too small a ratio there will be an output decrease with a decrease in durability at high temperature and high humidity, and at too large a ratio there will be a noise increase, again, with a decrease in durability at high temperature and high humidity. It is noted that the atomic ratio of the rare earth element(s)/Si is of the order of 0.03 to 0.6 and the atomic ratio of O/N in the second dielectric layer 6 is of the order of 0.2 to 3. At too small a ratio there will be a decrease in durability at high temperature and high humidity, and at too large a ratio there will be an output decrease with degradation-with-time. Such atomic ratios may be determined by analytical means such as Auger electron spectrometry or EDS. It is understood that the second dielectric layer 6 may have concentration gradations of oxygen and nitrogen in the thickness direction.

The refractive index (a real part of the index of double refraction) n of the second dielectric layer 6 at 600 to 900 nm is preferably 1.8 to 3.0, and more preferably 1.8 to 2.5. At a refractive index less than 1.8 the Kerr angle of rotation will become small with an output decrease, and at a refractive index exceeding 3.0 there will be an output decrease with an increased noise.

Preferably, the second dielectric layer 6 is formed by sputtering techniques. It is then desired that a sintered rare earth element, preferably a sintered mixture of $La_2O_3$ and/or $CeO_2$, $SiO_2$ and $Si_3N_4$ be used as a target. In this case, the rare earth oxides, especially, $La_2O_3$ and/or $CeO_2$ may be partly or wholly substituted by oxides of pyrophoric alloys such as Auer metal, Huber metal, Misch metal, and Welsbach metal. In association with this, other vapor phase film-forming techniques, for instance, CVD, evaporation and ion plating, may optionally be used. It is understood that the dielectric layer may contain as impurities Ar, $N_2$ or the like which exist in a film-forming atmosphere, and may additionally contain as impurities elements such as Fe, Ni, Cr, Cu, Mn, Mg, Ca, Na, and K.

Preferably, the second dielectric layer 6 is up to 80 nm, particularly 5 to 60 nm, and more particularly 5 to 50 nm in thickness. To augment light transmittance and increase output, it is preferable to make the dielectric layer thin. Here it is noted that the second dielectric layer 6 may be made thinner by using a material of low thermal conductivity to make the reflecting layer 7 to be provided thereon. It is understood that too thin a layer will give rise to an increased noise, whereas too thick a layer will result in a decrease in output and C/N. Such second dielectric layer 6 is decreased in film stress and excellent in durability under heat cycles, and produces an enhanced effect on protecting the recording layer as well.

The metal reflecting layer 7 provided on the second dielectric layer 6 may be made of various known metallic materials, for instance, Au, Ag, Al, Cu, Cr, Ni, Ti and Fe, or their alloys. Among these, Al, Ni, Al alloys and Ni alloys, especially, Al alloys and Ni alloys are preferred, because they show predetermined reflectivity, give rise to an improvement in output, and achieve significant improvements in sensitivity and recording power margin, when used in combination with the second dielectric layer 6.

Preferable Al alloys contain 80 to 99 wt % of Al and at least one element selected from Ni, Fe, V, Mo, Hf, W, Au, Si, Mg, Mn, Cr, Ta, Ti, Re, Zn, In, Pb, P, Sb, Cu, Zr, Nb, Bi, etc. The Al alloys are most excellent in terms of the effect on recording power margin enhancement, and make C/N very high with an improvement in recording sensitivity. Particular preference is given to Al—Ni alloys containing up to 20 wt %, especially 1 to 10 wt % of Ni with the balance being substantially Al. The Ni alloys are particularly preferable because of their low thermal conductivity and because they have the highest effect on an increase in recording sensitivity. Among these, alloys containing 35 to 75 wt % of Ni and at least one element selected from Co, Cr, Mo, W and Fe are more preferable, but the most preference is given to the so-called hastelloy alloys containing 35 to 75 wt %, especially, 40 to 70 wt % of Ni, 0.1 to 5 wt %, especially, 0.5 to 5 wt % of Co, 0.1 to 25 wt %, especially, 0.5 to 25 wt % of Cr, 0 to 6 wt % of W, 2 to 30 wt %, especially, 5 to 30 wt % of Mo, and 0.1 to 25 wt %, especially, 1 to 22 wt % of Fe. These hastelloy alloys may additionally contain up to 3 wt % of Cu, Nb and Ta, up to 2 wt % of Mn, up to 1 wt % of Si and Ti, etc. These Ni alloys achieve extremely high sensitivity when used in combination with the second dielectric layer mentioned above. By use of the Ni alloys of low thermal conductivity is it possible not only to make the second dielectric layer so thin that improved output is achieved, but also to make the metal reflecting layer 7 itself thin.

Such metal reflecting layer 7 is preferably 40 to 150 nm and more preferably 50 to 100 nm in thickness. When the layer 7 is thinner than required, its own effect disappears, resulting in output and C/N decreases. If it is too thick, then a sensitivity drop will take place.

It is desired that the light reflectivity of the medium after such reflecting layer has been provided thereon be 15% or higher, and it is desired that the real part n of the index of double refraction of the reflecting layer 7 be 1.5 to 3.5, with the imaginary part having an extinction coefficient k of 2.5 to 7.0. Such reflecting layer 7 may be formed as by sputtering, evaporation, or ion plating, but preferably by sputtering.

Provided on such a reflecting layer is a protecting coat 8. For instance, the protecting coat 8 may be made of various resin materials such as ultraviolet-curing resin,, and may usually have a thickness of about 0.1 to 100 μm. The protecting coat 8 may be in either layer or sheet form. Preferably, the protecting coat 8 is obtained by irradiating a coated film containing a radiation-curing type of compound, especially, an acrylate one, and a photopolymerization sensitizer with radiation for curing.

Information is magnetically recorded on the recording layer 5—on which such reflecting and second dielectric layers 7 and 6 are provided—by a modulated heat beam or magnetic field, and the recorded information is reproduced by magneto-optical conversion. No critical limitation is placed on the material of which the recording layer 5 is made, provided that it makes magneto-optical recording possible. However, it is preferable that it is formed into an amorphous film by sputtering, evaporating or ion plating, especially, sputtering an alloy containing rare earth metal elements, especially, an alloy of rare earth and transition metals.

For the rare earth metals use is preferably made of at least one metal selected from Tb, Dy, Nd, Gd, Sm and Ce. The rare earth metal or metals are used in an amount of about 15 to 23 at %. For the transition metals use is preferably made of Fe and Co. It is then desired that the total amount of Fe and Co be 55 to 85 at %.

A preferably used recording layer may have such compositions as TbFeCo, DyTbFeCo, NdDyFeCo, and NdGdFeCo. Additionally, the recording layer may contain elements like Cr, Al, Ti, Pt, Si, Mo, Mn, V, Ni, Cu, Zn, Ge, and Au, provided that their total amount is up to 30 at %. Moreover, the recording layer may contain rare earth metal elements like Sc, Y, La, Ce, Pr, Pm, Sm, Eu, Ho, Er, Tm, Yb and Lu on condition that their total amount is up to 10 at %. Usually, such recording layer 5 have a thickness of about 10 to 1,000 nm. For instance, a recording layer containing 5 to 1.5 at % of Co and 2 to 10 at % of Cr with an atomic Co/Cr ratio of 0.5 to 5.0 is preferable, because it has a Curie point Tc of 150° to 170° C. and good-enough temperature properties.

The substrate 2 is made of a material that is substantially transparent to recording light and reproducing light (semiconductor laser light of about 400 to 900 nm, particularly about 600 to 850 nm, and more particularly 780 nm) or, in another parlance, has a transmittance of 80% or more. This enables recording and reproduction to be done from the back side of the substrate. Resin or glass may be used for such substrate material. For the resin it is preferable to use various thermoplastic resins such as polycarbonate resin, acrylic resin, and amorphous polyolefin. If required, the substrate 2 may be provided with an oxygen-blocking film on its outer surface or periphery. Preferably, the substrate 2 is coated on the back side (opposite to the side provided with the recording layer 5) to make various protecting films. Here, too, such coating may be carried out with the same material as that forming the above-mentioned organic protecting layer 8.

The present invention is applied to a magnetic field modulation type of magneto-optical recording. In this mode of recording a magnetic head is positioned on the surface of a magneto-optical disk (with a recording layer formed on it) while an optical head is positioned on the back side of the disk, so that laser light of constant intensity can strike from the optical head onto the recording layer through the substrate. A modulated magnetic field is applied from the magnetic head onto spots of the recording layer which are irradiated with laser light for recording. The magnetic and optical heads are relatively fixed in position, and they move together in the diametrical direction of the disk, so that they are accessible to a predetermined track. The applied magnetic field may be of the order of 100 to 300 Oe. The magnetic and optical heads used in the invention are not critical in construction; a suitable choice may be made among various magnetic and optical heads used for an ordinary magnetic field modulation type of magneto-optical recording.

For recording and reproduction with the magneto-optical disk according to the present invention, it is preferable to make use of a drive including an optical head equipped with an objective having a numerical aperture NA of 0.40 to 0.50, preferably 0.44 to 0.46. It is then desired to use recording and reproducing light of preferably 600 to 900 nm wavelength, more preferably 770 to 790 nm wavelength. For recording and reproduction, it is preferable that the recording layer is irradiated with linearly polarized light while the direction of the electric field vector defines the diametrical direction of the substrate (or in the direction vertical to the groove).

By use of such an optical system are all the push-pull signal level, radial contrast and C/N allowed to have satisfactory values. In the grooved region it is desired that the push-pull signal level, radial contrast and C/N lie at 0.11 to 0.20, 0.20 to 0.35 and 47 dB or more, respectively. In this regard, if the optical system mentioned above is used while the angles $\theta$ in the sectional configuration of the groove are limited to within the range mentioned above, it is then easy to achieve each property within the range mentioned above. The value of C/N mentioned in the present disclosure is understood to refer to one found when recording is done with the optimal recording power while the magnetic field strength on the surface of the recording layer is reduced to a relatively low level (about 100 to 300 Oe).

More illustratively but not exclusively, the present invention will now be explained in greater detail with reference to some examples.

EXAMPLE 1

Magneto-optical disk samples set out in Table 1 were fabricated.

First, a polycarbonate resin substrate having an outer diameter of 64 mm, an inner diameter of 11 mm and a recording portion of 1.2 mm in thickness was prepared by injection molding. During injection molding a spiral form of groove was formed on one major surface of the substrate. Inside the spiral groove there were provided given pits.

Then, an SiNx dielectric layer—where x was equal to 1.3, n was equal to 2.0 and k was nearly equal to 0)—was provided on the grooved major surface of the substrate at a thickness of 90 nm by means of high-frequency magnetron sputtering. Subsequently, a recording layer having a composition of $Tb_{19}Fe_{65}Co_8Cr_8$ (Tc=150° C.) was provided on the dielectric layer at a thickness of 20 nm, so that the groove and pits were covered therewith. It is understood that n was measured with an ellipsometer.

Moreover, the same SiNx dielectric layer as mentioned above was provided on the recording layer at a thickness of 20 nm by means of high-frequency magnetron sputtering. Finally, an Al alloy protecting layer of 80 nm in thickness and a protecting coat were provided on the obtained protecting layer in this order, thereby fabricating a magneto-optical disk sample.

The protecting coat was obtained by forming a film having the following composition for polymerization by spin coating and curing the film by irradiation with ultraviolet rays, and was found to have a mean thickness of about 5 μm,, as measured after curing. The dose of ultraviolet rays was 1,000 mJ/cm$^2$.

| Composition for Polymerization | |
| --- | --- |
| Oligoester acrylate (M.W.: 5,000) | 50 ppw |
| Trimethylolpropane acrylate | 50 ppw |
| Acetophenone photopolymerization initiator | 3 ppw |

Other samples were fabricated in the same manner as mentioned above, with the exception that other stampers were used for substrate preparation. Here it is noted that Samples 1–6 have varying groove configurations, while Samples 7–8 have varying pit configurations. The stampers mentioned above were made using resists having varying resolutions at the mastering step and by irradiation with light under varying conditions.

After immersed in liquid nitrogen, each magneto-optical disk sample was cut out in the diametrical direction to measure the sectional geometry of the groove or pits in the substrate, using a scanning electron microscope. Moreover, the angles $\theta_{10}$, $\theta_{50}$ and $\theta_{90}$, shown in Table 1, were found by the method mentioned above. It is noted that the track pitch was 1.6 μm.

Each sample was measured in terms of the properties set out in Table 1. In Table 1, P-P(Gr) and P-P(Pit), and RC(Gr) and RC(Pit) stand for push-pull signal levels and radial contrasts in the groove and pits, respectively, and SKM(Gr) represents a skew margin angle in the groove.

For measurement, a drive equipped with an optical head including an objective with a numerical aperture of 0.45 was used to irradiate each sample with linearly polarized laser light of 780 nm wavelength, while the direction of the electric field vector defined the diametrical direction of the disk sample. C/N was found with a 3T signal of EFM at a recording power of 4.55 mW, a read power of 0.60 mW, a magnetic field strength of 100 Oe on the surface of the recording layer, and a linear speed of 1.4 m/s.

forming to the conditions mentioned just above are inferior thereto in terms of electrical properties.

EXAMPLE 2

The substrate for Sample 1 in Example 1 was again used. In other words, $\theta_{10}$ is 45.2 deg., $\theta_{50}$ is 44.0 deg., and $\theta_{90}$ is 16.6 deg.; the conditions $\theta_{10} \geq \theta_{50}$ and $\theta_{50} > \theta_{90}$ are satisfied.

Using an Si target and N$_2$ gas, SiNx films varying in thickness were formed on the substrate mentioned above by means of high-frequency magnetron sputtering, followed by the formation of the same recording film, SiNx film, reflecting film and protecting sheet as in Example 1. That is, two SiNx films were formed, one wherein x was equal to 1.3, n was equal to 2.0 and k was nearly equal to 0, and the other wherein x was equal to 0.75, n was equal to 2.3 and k was nearly equal to 0. By simulation, a thickness-reflectivity curve at 780 nm was found, using these values of n and k. The results of simulation and the found values are set out in FIG. 3.

with the results shown in FIG. 3 in mind, samples having regulated reflectivity were obtained with other films being the same as in Example 1; reflectivity was regulated to 58 nm less than $t_{min}$ (76 nm) and 100 nm more than $t_{min}$ in the case where x=1.30 and n=2.0, and to 30 nm less than $t_{min}$ (63 nm) and 95 nm more than $t_{min}$ in the case where x=0.75 and n=2.3.

These samples were measured in terms of (1) reflectivity, and (2) the optimal recording power and recording power margin.

(1) Reflectivity (of media)

While each disk sample was irradiated with semiconductor laser of 780 nm wavelength, its reflectivity at 780 nm was measured by means of a magneto-optical recording disk inspector.

(2) Optimal Recording Power and Recording Power Margin

While each disk sample was rotated at a CLV of 1.4 m/s and irradiated with continuous laser light of 780 nm, EFM signals were recorded by magnetic field modulation in the presence of an applied magnetic field of 200 Oe. While the recording power was varied, a jitter of 3T signals was measured to determine powers $P_{min}$ and $P_{max}$ at which the jitter fell below 40 nsec. Then, the optimal recording power or $P_o = 1.4\ P_{min}$ and the recording power margin or $(P_{max}-P_{min})/2$ were found by calculation.

TABLE 1

| Sample | $\theta_{50}$ | $\theta_{10}$ | $\theta_{90}$ | $\theta_{10} \geq \theta_{50}$ | $\theta_{50} > \theta_{90}$ | RC (Gr) | P-P (Gr) | RC (Pit) | P-P (Pit) | C/N | SKM (Gr) |
| --- | --- | --- | --- | --- | --- | --- | --- | --- | --- | --- | --- |
| 1 (Gr) | 44.0 | 45.2 | 16.6 | ○ | ○ | 0.35 | 0.14 | | | 49.6 | ±1.0 deg |
| 2 (Gr) | 30.4 | 33.6 | 16.9 | ○ | ○ | 0.22 | 0.12 | | | 47.5 | ±1.5 deg |
| 3 (Gr) | 33.7 | 52.0 | 16.9 | ○ | ○ | 0.31 | 0.14 | | | 49.2 | ±1.2 deg |
| 4 (Gr) | 27.0 | 28.1 | 16.0 | ○ | ○ | 0.21 | 0.11 | | | 47.2 | ±1.2 deg |
| 5 (Gr) | 40.3 | 40.3 | 40.3 | ○ | X | 0.42 | 0.09 | | | 49.2 | ±0.6 deg |
| 6 (Gr) | 28.1 | 19.9 | 16.9 | X | ○ | 0.17 | 0.07 | | | 46.8 | ±1.2 deg |
| 7 (Pit) | 37.2 | 38.5 | 24.6 | ○ | ○ | | | 0.26 | 0.043 | | >±1.5 deg |
| 8 (Pit) | 25.6 | 28.3 | 10.9 | ○ | ○ | | | 0.21 | 0.050 | | >±1.5 deg |

From the results shown in Table 1, it is found that the radial contrast RC, push-pull signal level, etc. come within the desired ranges in the case of Samples 1, 2, 3, 4, 7 and 8, all conforming to the presently claimed conditions; $\theta_{10} \geq \theta_{50}$ and $\theta_{50} > \theta_{90}$, but the samples not con-

TABLE 2

1st Dielectric Layer

| Refractive index (n) | $t_{min}$ (nm) | Thickness (nm) | Reflectivity (%) | $P_o$ (mW) | Margin (mW) | P-P (pit) |
| --- | --- | --- | --- | --- | --- | --- |
| 2.0 | 76 | 58 | 18.8 | 4.42 | 1.35 | 0.045 |
| 2.0 | 76 | 100 | 18.8 | 4.88 | 1.05 | 0.041 |

TABLE 2-continued

| 1st Dielectric Layer | | | | | | |
|---|---|---|---|---|---|---|
| Refractive index (n) | $t_{min}$ (nm) | Thickness (nm) | Reflectivity (%) | $P_o$ (mW) | Margin (mW) | P-P (pit) |
| 2.3 | 63 | 30 | 19.0 | 4.36 | 1.18 | 0.048 |
| 2.3 | 63 | 95 | 19.0 | 4.56 | 0.89 | 0.042 |

The results shown in Table 2 teach that by making the thickness of the first dielectric layer less than $t_{min}$, $P_o$ is lower, and the margin is wider, than would be possible with a dielectric layer designed to have the same reflectivity but a thickness more than $t_{min}$. Also they show that when the first dielectric layer having a thickness less than $t_{min}$ is used with each of the samples used in Example 1, there is a further increase in bit push-pull, which is synergistically combined with the shape of the substrate to make the effect of the invention much higher.

EXAMPLE 3

Experimentation was done with the same film structure as in Example 1 with the exception that SiNx where x was equal to 1.30, n was equal to 2.0 and k was nearly equal to 0 and LaSiON were used for the second dielectric layer with the thickness shown in Table 3. The results are set out in Table 3. It is noted that the LaSiON was obtained by the high-frequency magnetron sputtering of a sintered member consisting of 30 mol % of $La_2O_3$, 20 mol % of $SiO_2$ and 50 mol % of $Si_3N_4$.

TABLE 3

| 1st/2nd Dielectrics | | SiN/SiN | | | SiN/LaSiON | | |
|---|---|---|---|---|---|---|---|
| Thickness (nm) | Reflectivity (%) | $P_o$ (mW) | Margin (mW) | | Reflectivity (%) | $P_o$ (mW) | Margin (mW) |
| 55/20 | 20.0 | 4.68 | 1.35 | | 20.0 | 4.16 | 1.35 |

The results shown in Table 3 reveal that a disk of satisfactory recording sensitivity can be obtained by the optimum combination of the shape of the instant substrate, film thickness and the second dielectric layer.

EXAMPLE 4

A disk sample was prepared using LaSiON for the second dielectric layer of Example 3 and using a varying recording layer of $Tb_{18.0}Fe_{64.0}Co_{10.0}Cr_{8.0}$ (Tc=160° C.). Another sample obtained using a recording layer composed of $Tb_{19.0}Fe_{65.0}Co_{8.0}Cr_{8.0}$ (Tc=150° C.) as in Example 1, a 120 nm-thick first dielectric layer of SiNx where $t_{min}$=76 nm, x=1.30 and n=2.0), and a 40 nm-thick second dielectric layer of SiNx where x=1.30 and n=2.0. Each disk had an Al—Ni reflecting layer having a thickness of 60 nm and a reflectivity of 20%. The disk was then measured in terms of $P_o$ at room temperature and 70° C., and a jitter increase at 70° C. The results are set out in Table 4.

TABLE 4

| Disk | Layer Arrangement | Room Temperature | 70° C. |
|---|---|---|---|
| Comaprison | 1st dielectric layer SiN, 120 nm recording layer Tc = 150° C. composed of $Tb_{19.0}Fe_{65.0}Co_{8.0}Cr_{8.0}$ 2nd dielectric layer SiN, 40 nm | $P_o$ = 4.42 mW Reflectivity, 20% | $P_o$ = 4.0 mW jitter + 5 ns inc. |
| Invention | 1st dielectric layer SiNx, 55 nm recording layer Tc = 160° C. composed of $Tb_{18.0}Fe_{64.0}Co_{10.0}Cr_{8.0}$ 2nd dielectric layer LaSiON, 20 nm | $P_o$ = 4.42 mW Reflectivity, 20% | $P_o$ = 4.25 mW jitter + 2 ns inc. |

The results shown in Table 4 indicate that the present invention makes it possible to use a recording layer having a much higher Tc, and thereby obtain a disk that is stable with respect to a temperature change.

What is claimed is:

1. A magneto-optical disk, comprising:
   a disk-shaped substrate including a recessed region on the surface thereof and a recording layer provided such as to cover said recessed region;
   said recessed region having alternately arranged grooves and lands, each of said grooves having a cross-sectional geometry defined by curvilinear side walls and a base, each groove having a width between the side walls and each land having a width between the adjacent grooves;
   the ration of groove width to land width is at least one; and the geometry of said grooves conforms to:

$$\theta_{10} \geqq \theta_{50}$$

$$\theta_{50} \geqq \theta_{90},$$

and $$\theta_{50} - \theta_{90} \geqq 5 \text{ degrees,}$$

wherein
$\theta_{10}$, $\theta_{50}$ and $74_{90}$ are respectively angles that tangential lines make with horizontal lines 10%, 50% and 90%-depth positions of the side wall of the recess in the diametrical direction of the substrate.

2. The magneto-optical disk of claim 1 wherein the angle $\theta_{50}$ is 20 degrees or more.

3. The magneto-optical disk of claim 2 wherein the angle $\theta_{50}$ is from 25 degrees to 80 degrees.

4. The magneto-optical disk of claim 1 wherein a value of $\theta_{10}-\theta_{50}$ is 0 to 60 degrees.

5. The magneto-optical disk of claim 4 wherein a value of $\theta_{10}-\theta_{50}$ is 1 to 30 degrees.

6. The magneto-optical disk of claim 1 wherein the track pitch is 1.60 μm or less.

7. The magneto-optical disk of claim 6 wherein the track pitch is from 1.2 μm to 1.59 μm.

8. The magneto-optical disk of claim 1, wherein a value of $\theta_{50}-\theta_{90}$ is at least 10 degrees.

9. The magneto-optical disk of claim 1, wherein said recessed region further includes pits, each of said pits having a cross-sectional geometry defined by curvilinear side walls and a base, and the geometry of said pits satisfies the same angular requirements as said grooves.

10. The magneto-optical disk of claim 9 wherein a groove width is from 0.90 to 1.15 μm and a groove depth is from 600 to 900 Å.

11. The magneto-optical disk of claim 9 wherein a pit width is from 0.40 to 0.50 μm and a pit depth is from 650 to 900 Å.

12. The magneto-optical disk of claim 1, which is made up of a substrate including thereon a first dielectric layer, a recording layer, a second dielectric layer, a metallic reflecting layer and a protecting coat in this order, wherein:
the thickness of the first dielectric layer is made smaller than a first minimal point $t_{min}$ of reflectivity at the smallest thickness of a thickness-reflectivity curve at the wavelength of recording light, and
magneto-optical recording is done in a magnetic field modulation mode.

13. The magneto-optical disk of claim 12 wherein the thickness of the first dielectric layer is from 30 nm to 0.99 $t_{min}$ inclusive.

14. The magneto-optical disk of claim 12 wherein the refractive index n of the first dielectric layer is from 1.8 to 3.0.

15. A method of making a magneto-optical disk using a substrate in the form of a disk, comprising the steps of:
forming a recessed region having at least one groove for recording information therein and pits on the surface of said disk;
covering said recessed region with a recording layer;
conforming the geometry of said at least one groove and pits to:

$$\theta_{10} \geq \theta_{50}$$

$$\theta_{50} > \theta_{90}$$

where $\theta_{10}$, $\theta_{50}$ and $\theta_{90}$ are respectively the angles that tangential lines make with horizontal lines at. 10%, 50% and 90% depth positions of a side wall of the recess in the diametrical direction of the substrate;
controlling the formation of tracks by a push-pull technique; and
detecting a track by using a radial contrast technique.

16. The magneto-optical recording method of claim 15, wherein, in said step of controlling the formation of tracks, the push-pull signal level in a grooved area is from 0.11 to 0.20 and the radial contrast in a grooved area is from 0.20 to 0.35.

17. The method according to claim 15, wherein, in said step of conforming the geometry of said at least one groove, the angle $\theta_{50}$ is 20 degrees or more.

18. The method according to claim 17, wherein, in said step of conforming the geometry of said at least one groove, the angle $\theta_{50}$ is from 25 to 80 degrees.

19. The method according to claim 15, wherein, in said step of conforming the geometry of said at least one groove, the value of $\theta_{10}-\theta_{50}$ is 0 to 60 degrees.

20. The method according to claim 19, wherein, in said step of conforming the geometry of said at least one groove, the value of $\theta_{10}-\theta_{50}$ is 1 to 30 degrees.

21. The method according to claim 15, wherein, in said step of conforming the geometry of said at least one groove, the value of $\theta_{50}-\theta_{90}$ is 5 degrees or more.

22. The method according to claim 15, wherein., in said step of controlling the formation of tracks., the track pitch is from 1.6 μm or less.

23. The method according to claim 22, wherein, in said step of controlling the formation of tracks, the track pitch is from 1.2 μm to 1.59 μm.

24. The method according to claim 15, wherein, in said step of conforming the geometry of said at least one groove, the groove width is from 0.90 to 1.15 μm and the groove depth is from 600 to 900 Å.

25. The method according to claim 15, wherein, in said step of conforming the geometry of said pits, the pit width is from 0.40 to 50 μm and the pit depth is from 650 to 900 Å.

26. The method of making a magneto-optical disk according to claim 15, further comprising the steps of forming a first dielectric layer, a recording layer, a second dielectric layer, a metallic reflecting layer and a protective coat on said substrate in the order mentioned, and forming the thickness of said first dielectric layer smaller than a first minimal amount $t_{min}$ of reflectivity at the smallest thickness of a thickness-reflectivity curve at the wavelength of recording light, and wherein magneto-optical recording is performed by the magnetic field modulation mode.

27. The method of making a magneto-optical disk according to claim 26, wherein, in said step of forming a first dielectric layer the thickness of said dielectric layer is from 30 μm to 0.99 $t_{min}$ inclusive.

28. The method of making a magneto-optical disk according to claim 26, wherein, in said step of forming a first dielectric layer the refractive index n of the first dielectric layer is from 1.8 to 3.0.

* * * * *

UNITED STATES PATENT AND TRADEMARK OFFICE
CERTIFICATE OF CORRECTION

PATENT NO. : 5,430,706
DATED : Jul. 4, 1995
INVENTOR(S) : Hajime UTSUNOMIYA; Masanori SHIBAHARA It is certified that error appears in the above-identified patent and that said Letters Patent is hereby corrected as shown below:

Column 14, line 51, "$74_{90}$" should be --$\theta_{90}$--

Signed and Sealed this

Nineteenth Day of September, 1995

Attest:

BRUCE LEHMAN

Attesting Officer

Commissioner of Patents and Trademarks